Feb. 7, 1939.  F. FRIEDMAN  2,145,979
AUTOMATIC GEAR SHIFT
Filed Sept. 22, 1937  2 Sheets-Sheet 2
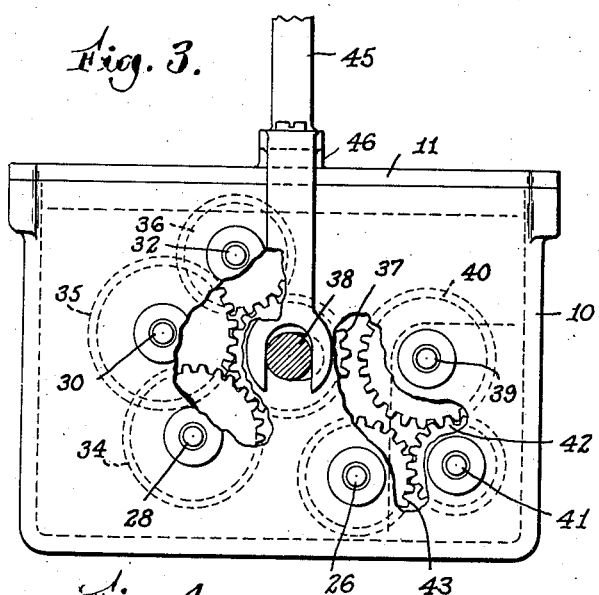
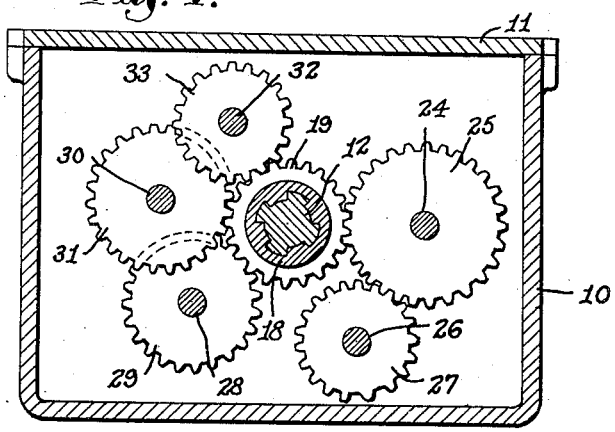
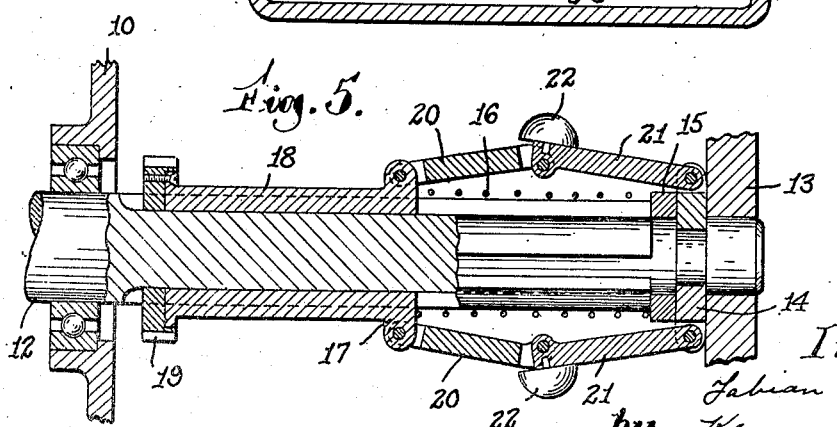
Inventor
Fabian Friedman
by Kenway & Witter
Attorneys

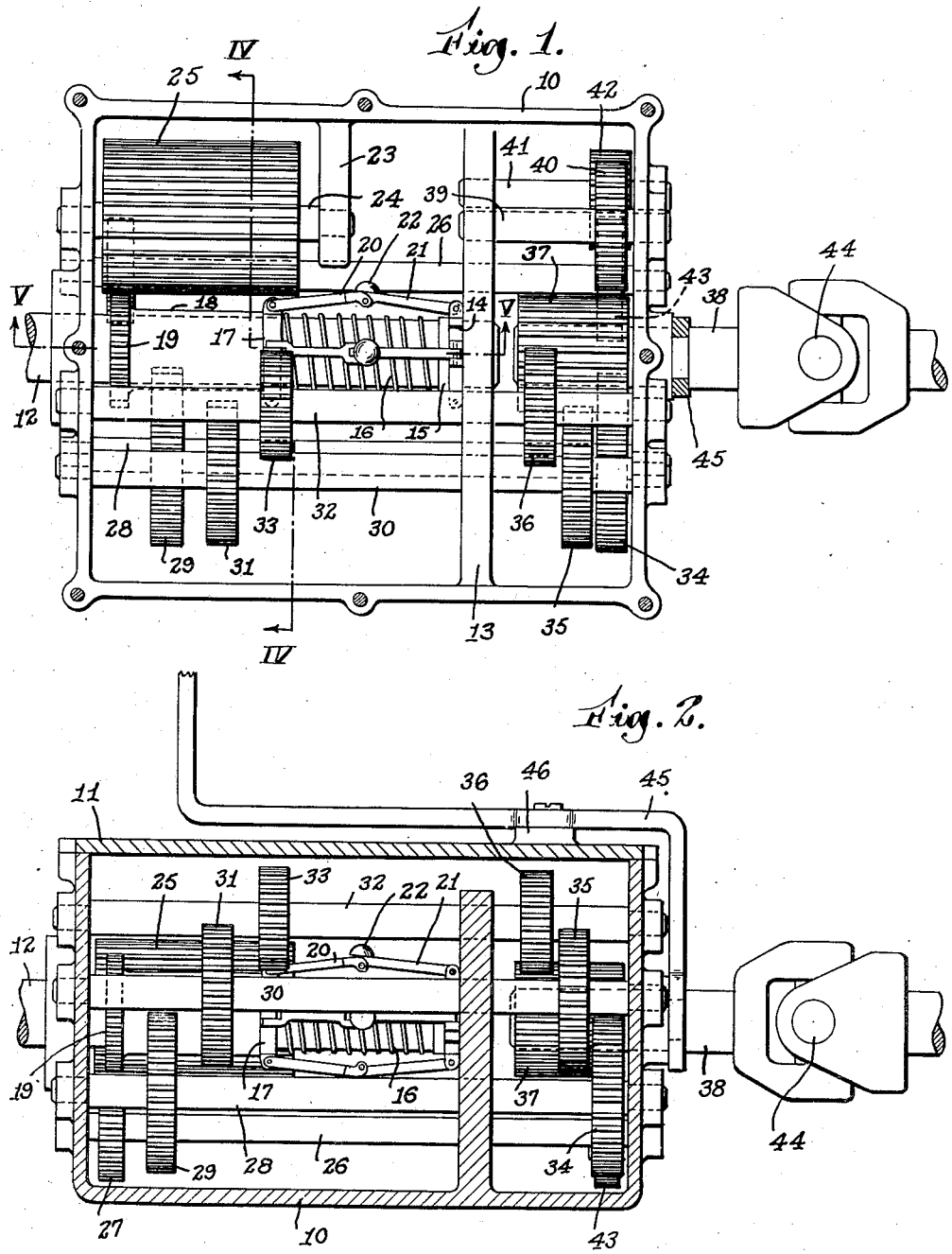

UNITED STATES PATENT OFFICE 2,145,979

AUTOMATIC GEAR SHIFT

Fabian Friedman, Watertown, Mass.

Application September 22, 1937, Serial No. 165,105

4 Claims. (Cl. 74—336.5)

My invention relates to automobiles or other self-propelled road vehicles in which means must be provided for transmitting power from the engine to the wheels through different gear ratios. More specifically, my invention relates to an automatic gear-shifting apparatus wherein no clutch is necessary and the only manual control is a lever for engaging a reversing gear train.

One object of my invention is to provide a transmission wherein the shifting of the gears is governed solely by the speed of the engine. In the ordinary automobile, the driver must shift the gears whenever he sees fit, and unskillful drivers often seriously damage the automobile by shifting before the engine has attained sufficient speed or by failing to shift to a lower speed when the engine is laboring under a heavy strain, as when the automobile is climbing a steep hill. Moreover, in congested city traffic it often happens that confusion and delay result when several automobiles which have been halted by a police officer or traffic signal attempt to start up again. Each driver picks his own time to shift, and the result is that traffic starts up in jerks instead of moving smoothly along at increasing speed. By providing automobiles with unconditionally automatic transmissions it is possible to avoid such disadvantages. In other words, traffic will move more smoothly when the human element is diminished in importance.

Another object of my invention is to prevent the damage to an automobile engine which results from "racing the motor." It is the custom of persons ignorant of mechanics to race the engine as soon as it starts in order to warm it up for more efficient performance. This practice is to be avoided inasmuch as some parts of the engine heat up more rapidly than others and the consequent uneven expansion of the moving parts results in scarring of the cylinder walls and similar evils which shorten the life of the engine.

My invention comprises a gear slidably mounted on the drive shaft and adapted to be displaced through the operation of a centrifugal governor actuated by the drive shaft. As the speed of the latter shaft increases, the gear is pulled along the drive shaft to mesh successively with the forward speed gears connected to the driven shaft. The driven shaft has a universal joint which permits it to be moved sideways out of engagement with the forward speed gears and into engagement with a reversing gear mechanism. Movement of the driven shaft is effected by a lever extending into the body of the automobile near the seat of the driver, and the only manual control of the gearing in the transmission is the lever which permits a change from forward speed to reverse.

Many attempts have been made to devise an automatic transmission, but no transmission known to me is unconditionally automatic in forward speeds and governed solely by the speed of the engine. The fact that my transmission functions in an unconditionally automatic manner necessarily results in the elimination of the disadvantages enumerated in the preceding paragraphs.

These and other features of my invention will be more readily understood and appreciated from the following description of a preferred embodiment thereof, selected for purposes of illustration and shown in the accompanying drawings in which,—

Fig. 1 is a plan view of a transmission according to my invention with the cover removed for purposes of clarity, Fig. 2 is a view in side elevation with the side wall removed, Fig. 3 is a view in end elevation with several parts removed, Fig. 4 is a view in cross section along the line IV—IV in Fig. 1, and Fig. 5 is a view in cross section of the drive shaft and centrifugal governor.

In carrying out my invention, I provide a rectangular box or casing 10 of cast iron or other suitable material, which is closed by a flat cover 11 bolted to the top thereof. Within the casing 10 is a transverse partition 13 containing bearings for the drive shaft 12 which is journaled horizontally in the casing 10. Adjacent the partition 13 (Fig. 2) on the shaft 12 is a collar 14 secured in a peripheral groove on the shaft 12. A helical compression spring 16 embraces the shaft 12 and abuts at one end against a stop ring 15 keyed to the collar 14. A slip ring 17 on the shaft 12 abuts the other end of the spring 16 and is formed with four T shaped keys 18 which slide longitudinally along the shaft 12 in grooves. An external spur gear 19 is loosely fitted on the shaft 12, but is rigidly connected to the ring 17 and thus held against relative rotation with the shaft 12, although longitudinal movement remains possible. A fly ball governor is disposed on the shaft 12 and comprises four links 20 connected at equal intervals to the slip ring 17, four links 21 similarly connected to the collar 14, and four fly balls 22. Each of the links 20 is pivotally connected to one end of the links 21, and a fly ball is mounted on each one of the links 21 adjacent the pivotal connection. It will now be understood that rapid rotation of the drive shaft 12 will cause the fly balls 22 to move away from the shaft 12 thus pulling the slip ring 17, the keys 18, and the gear 19 along the shaft 12. When the speed of the shaft 12 is reduced, the spring 16 forces the gear 19 back along the shaft.

From one of the side walls of the casing 10 a lug 23 extends toward the interior and is apertured to form a bearing for a short horizontal shaft 24 on which is keyed an elongated spur gear 25 which is constantly in mesh with the spur gear 19. Substantially below the gear 25 is a horizontal counter shaft 26 journaled in the end walls of the casing 10, to which is keyed a gear 27 in mesh with the elongated gear 25.

Journaled in the end walls of the casing 10 in the side opposite the elongated gear 25 are three countershafts 28, 30, and 32 upon which are keyed gears 29, 31, and 33. The latter gears, which are progressively smaller in diameter, are located adjacent the drive shaft 12 and in a space smaller in length than the length of the gear 25. Also keyed on the countershafts 28, 30, and 32 are gears 34, 35, and 36. The result is that each countershaft has a gear at each end, and the gears on the same countershaft have the same diameter. The gears 34, 35, and 36 are normally meshed with an elongated pinion gear 37 fixed to the driven shaft 38, which is journaled in the end wall of the casing 10 in alignment with the drive shaft 12.

Adjacent the pinion 37 and on the same side of the casing 10 is a gear 40 keyed on a short horizontal shaft 39 journaled in the end wall of the casing 10 and the partition 13. A similarly journaled shaft 41 is disposed beneath the shaft 39 and carries a gear 42 which is meshed with the gear 40 and a gear 43 carried on the counter shaft 26. The gear 43 has the same diameter as that of the gear 27.

The driven shaft 38 is broken by a universal joint 44 and is so journaled in the end wall of the casing 10 that slight lateral movement is possible. A forked lever 45 embraces the driven shaft 38 and is pivotally mounted on a boss 46 on the cover 11.

In the operation of the structure described it must be assumed that the drive shaft 12 is suitably connected to an engine without the interposition of any clutch. For the sake of convenience it will also be assumed that the shaft 12 rotates counterclockwise, or away from the observer. When the engine is started and before any considerable speed has been reached, the governor will be in the position shown in the drawings. The gear 19 will rotate with the shaft 12 and turn the following train of gears: 25, 27, 43, 42, 40. If the lever 45 is manipulated so that the pinion gear 37 is held in mesh with the gear 40, it will be seen that the driven shaft 38 will be caused to rotate in clockwise direction counter to the direction of rotation of the drive shaft 12. The above described train of gears thus constitutes my reversing mechanism. If the gear 37 is maintained in mesh with the gear 40, it is out of mesh with the gears 34, 35, and 36, and if the speed of the engine is now increased, it will merely cause the driven shaft 38 to rotate faster.

Assuming that the engine is at idling speed and that the lever 45 has been moved to withdraw the pinion 37 from engagement with the gear 40 and place it in mesh with the gears 34, 35, and 36 (which is the situation in Fig. 1) the train of gears 19, 25, 27, 43, 42, 40, will be turning without a load. When the engine speed is increased, the centrifugal governor 22 will pull the gear 19 along the drive shaft 12 until it meshes with the gear 29. The driven shaft 38 is then caused to rotate by the gear train 19, 29, 34, and 37. This is low, or first speed inasmuch as the diameter of the gears 29 and 34 is relatively large. A further increase in engine speed results in moving the gear 19 further along the shaft 12 until it is in mesh with the gear 31 which causes the driven shaft 38 to rotate by means of the gear train 19, 31, 35, 37. This is the second speed, and the shaft 38 rotates more rapidly, inasmuch as the gears 31 and 35 are smaller than the gears 29 and 34. A further increase in speed moves the gear 19 along the shaft 12 until it meshes with the gear 33 which causes the driven shaft 38 to rotate through the gear train 19, 33, 36, 37. This is high speed, and the gears 33 and 36 are considerably smaller than either the gears 29 and 34 or the gears 31 and 35.

It will now be understood that the shifting of the gears is unconditionally automatic in forward speed. By properly spacing the gears 29, 31, and 33 it is possible to predetermine the exact speeds at which shifting will take place. In other words, gear shifting can now be done by skilled machine designers instead of by unskilled automobile drivers. The speed of the engine controls the particular train of gears to be used at any time. The most important result of my invention is the fact that the gear ratio will always be the correct one for the speed of the engine.

Those skilled in the art will at once perceive many possible variations in the structure described and illustrated, but the scope of my invention is limited only by the appended claims.

I claim:

1. In a transmission having rotatably mounted driving and driven shafts, a sliding gear slidably keyed on said driving shaft, a pinion on said driven shaft, a centrifugal governor for sliding said gear to and fro according to the speed of the driving shaft, three countershafts, adjacent said driving shaft, a set of gears on said countershafts constantly engaged with said pinion, and a second set of gears on said countershafts adapted to be successively engaged with said sliding gear, and reversing gears disposed between said driving and driven shafts.

2. An automatic transmission comprising a casing, driving and driven shafts in said casing, a sliding gear on said driving shaft, a pinion on said driven shaft, centrifugal governor means on said driving shaft for moving said sliding gear, three countershafts in said casing, gears disposed on said counter-shafts and in mesh with said pinion, and transmission gears disposed within said casing on said three countershafts, the transmission gears on said three countershafts being successively meshed with said sliding gear as the engine speed increases or decreases.

3. Automatic power transmission system comprising a casing, driving and driven shafts, three forward speed countershafts geared to said driven shaft, a sliding gear on said driving shaft adapted successively to engage gears on said three countershafts, a reversing shaft having a gear thereon geared to said sliding gear, a second gear on said reversing shaft, and a lever pivotally mounted on said casing and connected to said driven shaft for moving the latter into engagement with said second gear on said reversing shaft.

4. An automatic transmission comprising a casing, a driving shaft journaled in said casing, a driven shaft mounted for slight lateral movement in said casing, a pinion on said driven shaft, a sliding gear on said driving shaft, means responsive to the speed of the driving shaft, for controlling the position of said sliding gear on said driving shaft, countershafts in said casing, transmission gearing on said countershafts, a train of reversing gears, and means for meshing the pinion on said driven shaft either with said transmission gearing or with said reversing gears.

FABIAN FRIEDMAN.